United States Patent [19]

Woodward

[11] Patent Number: 5,027,940
[45] Date of Patent: * Jul. 2, 1991

[54] CONVEYOR STUB IDLER APPARATUS

[76] Inventor: William S. Woodward, 3261 Bitters Ct., Green Bay, Wis. 54301

[*] Notice: The portion of the term of this patent subsequent to Feb. 4, 2006 has been disclaimed.

[21] Appl. No.: 375,116

[22] Filed: Jul. 3, 1989

Related U.S. Application Data

[63] Continuation-in-part of Ser. No. 110,689, Oct. 20, 1987, Pat. No. 4,844,241.

[51] Int. Cl.$^5$ ............................................. B65G 45/02
[52] U.S. Cl. .................................... 198/500; 198/821; 198/829; 198/842
[58] Field of Search ............... 198/500, 501, 820, 821, 198/829, 840, 842; 193/37; 184/12; 384/474

[56] References Cited

U.S. PATENT DOCUMENTS

| Re. 16,432 | 9/1926 | Smith ................................. | 198/501 |
| 2,841,271 | 7/1958 | Malmgren ........................... | 198/829 |
| 4,541,740 | 9/1985 | Schard ................................ | 384/474 |
| 4,844,241 | 7/1989 | Woodward ......................... | 198/500 |

FOREIGN PATENT DOCUMENTS

| 729983 | 3/1966 | Canada ................................ | 198/821 |
| 1960304 | 6/1971 | Fed. Rep. of Germany ...... | 198/501 |
| 1239372 | 7/1971 | United Kingdom ................ | 198/820 |

Primary Examiner—Joseph E. Valenza
Attorney, Agent, or Firm—Andrus, Sceales, Starke & Sawall

[57] ABSTRACT

Stub idler units for a flexible sidewall belt conveyors support the return belt run. Each unit includes a stub roll fixed to and forming an integral part of a solid shaft. A pair of re-lubricable, sealed bearings are mounted within opposite ends of a tubular bearing housing secured within a tubular mounting bracket. The shaft is journaled in the bearings clamped to the housing by a locking nut on the shaft end. A lubrication passageway is formed in the mounting bracket and housing and provided with a lubrication fitting. The passageway connects to the chamber between the bearings lubricating the bearings. A flexible hydraulic grease line is attached to the far side mounting bracket in place of the grease fitting. The grease line extends across the conveyor belt to the near side of the conveyor and terminates in a grease fitting for re-lubrication of the far side stub idler. The line is supported at the two mounting brackets by suitable shaped support elements mounted to the mounting brackets.

3 Claims, 1 Drawing Sheet

CONVEYOR STUB IDLER APPARATUS

This is a continuation-in-part of Ser. No. 110,689 and filed Oct. 20, 1987 now U.S. Pat. No. 4,844,241 by William S. Woodward and entitled CONVEYOR STUB IDLER ROLL APPARATUS.

BACKGROUND OF THE PRESENT INVENTION

This invention relates to a conveyor stub idler apparatus and particularly to a stub idler including a roll for edge support of the return run of an endless flexible sidewall conveyor belt handling particulate matter and the like.

The movement of industrial products in the form of particulate and fibrous materials has for years been conveniently done with trough-type belt conveyors operating horizontally or at inclines to 20 degrees. The conveyor consists of a middle support structure with two or three inclined rollers (idlers) located every four to five feet along the top or "carrying side" of the frame in the order to form the belt into a trough. As fully discussed in the copending parent application, the idler bearings operate in relatively severe conditions and are preferably periodically lubricated in order to insure that the rollers turn and prevent belt damage. Of equal importance, however, the lubricant desirably purges the bearing seals of foreign matter caused by the congealing of the grease as it cools when the conveyor is shut down, drawing in the dirt to the bearing surfaces and the like. The idler structures of the prior art are described in the above application, which discloses an improved cantilevered lubricated idler for the sidewall conveyors in which the conveyor may run horizontally, turning up at steep angles (to 90 degrees or vertical) and then turning once more to the horizontal position to discharge. The cantilevered shaft design increased the shaft bending wovement. As a result, the industry standard shaft diameters (CEMA Rated) could not be used. Where the standard was used, the axial lubrication passageways were eliminated from the shafts, and the stub idlers were provides as "sealed for life", in place of the relubrication system. Prior art stub idler units also used conventional mounting arrangements, which provided for no "cross belt" adjustment. Therefore, the shafts were threaded and held in place by lock nuts on each side of the support bracket. However, adjustment was soon lost due to material build up and corrosion.

Although the device or the mounting or the stub idler apparatus shown in the parent application provides an improved stub idler unit mounting and bearing support, in certain applications the use of the axially apertured shaft did not provide a total desired support for the heavy cantilevered load encountered in such applications. An enlarged shaft structure was required and thus requires special construction and mounting. Generally, the trade prefers a structure which uses the standard diameter shaft.

Further in the conveyor apparatus to which the present invention is used, the stub idler rolls on the opposite sides of the conveyor are desirably periodically lubricated. With the vertical orientation of the conveyor, many of the stub idler units are above ground level. A stair and platform is generally provided adjacent one side of the conveyor for appropriate maintenance and servicing in normal usage.

Because of the high angle capability of these conveyors, the conveyors are generally include an inclined portion at an angle of between 45° and 75° and, conventional walkways are replaced with more expensive stairways or ladders and platforms to one side only of the conveyor. To duplicate the structure would be costly.

Servicing to the opposite or far side therefore generally requires the use of a special equipment. The inventor realized it would be desirable to provide a system for appropriate lubrication of both the far and near side stub units from the near side of the conveyor.

SUMMARY OF THE PRESENT INVENTION

The present invention is particularly directed to a conveyor stub idler unit for flexible sidewall belt conveyors, as disclosed in the parent application, in which the bearings are similarly mounted in a bearing mount bracket with an improved lubrication system permitting use of a solid shaft.

Generally, in the present invention, a cantilevered stub idler unit includes a solid shaft journaled in re-lubricable, sealed bearings secured within a closed mounting bracket unit to support the roll shaft and idler roll for rotation. In accordance with the teaching of the present invention, the mounting bracket unit, which preferably includes a tubular bearing housing fixed within a tubular mounting bracket, is provided with a fixed grease coupler to permit periodic lubrication of the bearings, and also permitting an interconnection of the grease coupler of the idlers on the opposite sides of the conveyor from one side of the conveyor. A channel or passageway is drilled in the mounting bracket and housing at a point midway between the two roller bearings. The passageway can be fitted with a grease fitting for relubrication from each side and fitted with hydraulic grease line for "one side" lubrication. In the far line connection, the grease line is threaded through support grease line brackets which are secured to a bracket mounting plate of the mounting bracket with the line extending under the conveyor belt. A thin wall tubing may be secured between the grease line brackets to protect the line. The fresh grease can thus be fed from one side between the bearings and permits re-lubrication from the rear side.

The passageway in any bearing assembly can of course also be plugged for a "sealed-for-life" design.

With the fixed external lubricating system fixedly mounted to the tubular supports, a cross lubrication system can be employed to permit lubrication from the stair side of the conveying mechanism of the conveyor. In the cross lubrication system, the mounting bracket to the opposite or far side from the stairs has a hydraulic line connected by a tubular coupling to the bearing unit in place of the grease fitting. The hydraulic line passed upwardly to a support secured to the mounting plate of the bracket and then extends across the conveyor above the bottom run of the belt and terminates at the stair or near side of the conveyor in a support member secured to the mounting bracket. A conventional grease fitting is secured to the end of the hydraulic line which is selected to introduce minimal pressure drop.

The present invention maintains a relatively simple bearing construction with the rigid support of the roll on a standard sized shaft mounted with an external re-lubrication system which may include re-lubrication from one side of the conveyor only. The structure of the invention can be formed using commercially available components, the commonly accepted idler bearing sizes, and readily understood fabrication technology.

BRIEF DESCRIPTION OF THE DRAWINGS

The drawings furnished herewith generally illustrate the best mode presently contemplated for the invention and is described herewith.

In the drawings.

DESCRIPTION OF THE ILLUSTRATED EMBODIMENT

Figure 1:
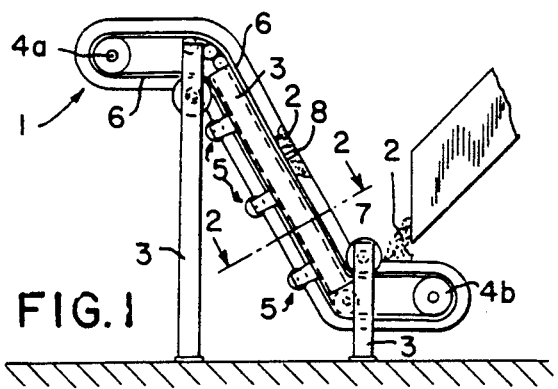
FIG. 1 is a side view of a conveyor for conveying of fibrous or particulate materials using flexible sidewall belting.
Figure 2:
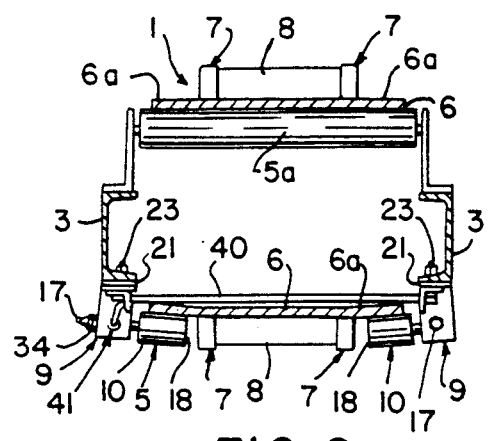
FIG. 2 is a cross section taken generally on line 2—2 of FIG. 1 and showing how stub idlers are mounted to the conveyor frame to support the return side of the belting and the "one side" re-lubrication system.
Figure 4:
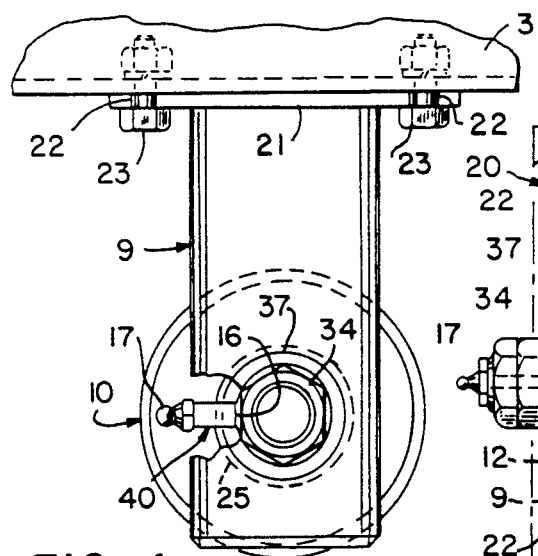
FIG. 4 is a front view of the stub idler unit.
Figure 5:
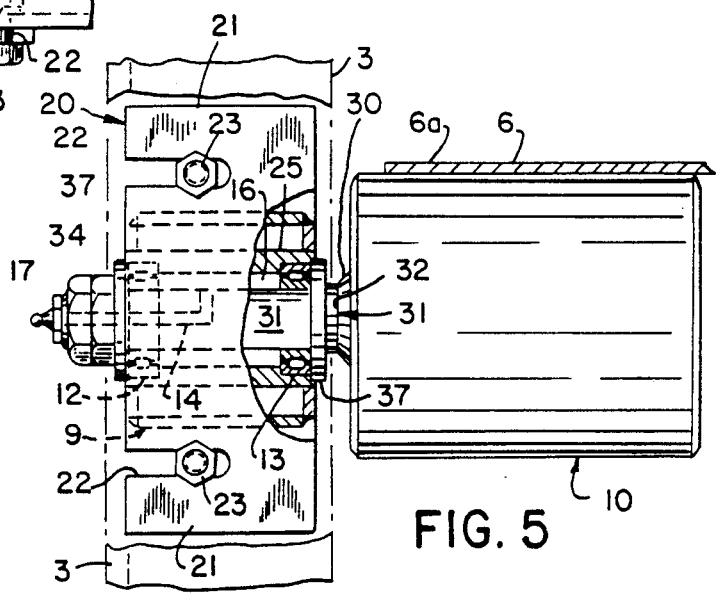
FIG. 5 is a view taken on line 5—5 of FIG. 3.
Figure 3:
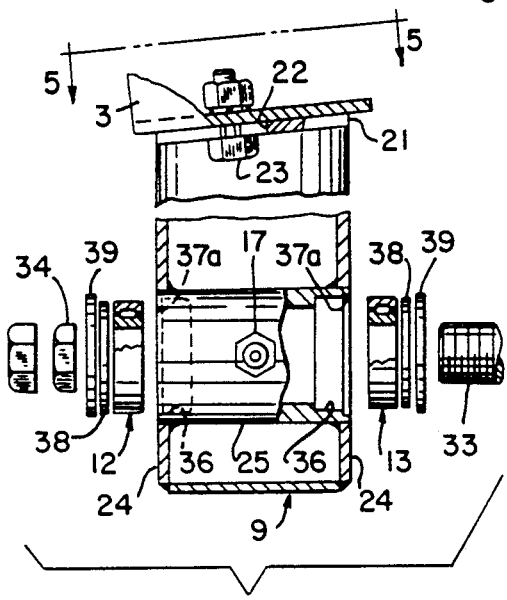
FIG. 3 is a side view of the stub idler unit illustrated and shown in FIG. 1.

Referring to the drawings and particularly to FIGS. 1 and 2, the present invention is shown applied to support an endless flexible sidewall belt 1 of belt conveyor for transport of various products 2 and particularly fibrous, particulate and like products, as in the prior identified copending application. The conveyor includes the flexible sidewall belt 1 that travels about a supporting structure 3, and is shown as a Z-shaped conveyor. The conveyor sidewall belt 1 is endless and suitably supported at its opposite ends with a drive pulley 4a and tail pulley 4b. The present invention is shown applied to a horizontal-inclined-horizontal belt conveyor for lifting and transfer of a particulate type of material 2 from a lower level to a higher level. The belt 1 includes a flat base member 6 having similar sidewalls 7 secured to the opposite edges of the belt base member. Each of the sidewalls 7 is a serpentine type of an element standing on edge and secured to the belt to confine the material on the belt. Lateral cleats 8 are secured to the belt at longitudinally spaced locations for supporting of the material 2 on the inclined portion of the belt and insuring transport and the upward carrying of the material. Such belts are well known and widely used in the industry. The belt structure with the flexible sidewall and cleats provide a relatively significant weight on the recessed portion 6a of the belt.

The intermediate length of belt 1 in the top (or carrying run) is supported by a series of spaced conventional flat idler rolls 5a which support the load and maintain a particular path of travel, including various horizontal and/or inclined portions, as shown. The idler roll 5a is a conventional idler roll mounted in formed bracket, and extends completely across and supports the base member 6. Stub idler roll units 5 are constructed in accordance with this invention and are mounted approximately 3 feet along the underside of the belt 1 to physically support the belt on the recessed portions 6a of the belt 1 and to maintain the desired location of the belt between the support frame. Each stub idler unit 5 is similarly constructed and forms the subject matter of the present invention.

Generally as illustrated, the structure 3 includes a longitudinal supporting frame member extending parallel to and immediately adjacent the outer edge of the belt 1. Each of the roll units 5 is secured to the underside of the frame member 3. The roll unit 5 includes the tubular mounting bracket 9 secured to the underside of the frame. A rotating roll 10 is rigidly affixed to a solid shaft 11 which extends through the bearings 12 and 13 in the mounting bracket 9. The bracket 9 is shown as a tubular member with spaced bearings 12 and 13 located and confined in an axially spaced relation within the mounting bracket 9. Bearing units 12 and 13 rotationally support the shaft 11 and roll 10, with the roll located adjacent to the bracket 9. Lubrication of the bearing units 12 and 13 is provided through the externally located fitting 17 secured in an opening in the mounting bracket 9.

In operation, the tubular bracket 9 is in the form of a post and appropriately located to establish the desired angle of orientation of the roll 10 with respect to the belt structure. The bracket 9 is adjustable to permit precise location of the roll 10 to the underside of the belt sidewall 7. In the illustrated embodiment of the invention, this permits precise orientation and location of the end face 18 of the roll 10 with respect to the adjacent belt sidewall 7. In addition and significantly, the bearing units 12 and 13 are located within the tubular bracket, which permits the use of a cantilevered solid shaft equal in size to the same size conventional idler, and still accept the high load of the belt. Likewise, bearing units 12 and 13 are close to the location of the grease fitting 17 and can be properly and/or conveniently lubricated through the short passageway.

The stub idler roll unit 5 of the present invention can therefore be readily and accurately installed at the necessary angle with respect to the belt for optimum tracking. The bearings are readily and effectively re-lubricated. The frequency of lubrication will, of course, vary with the application. The actual operating conditions, the environment, and the materials being transported, will all effect the lubrication requirements. In any event, a periodic lubrication schedule can be readily provided for re-lubrication of the bearings and purging of the seals as required. As more fully developed herein, the system can be readily lubricated without the necessity of the conventional high pressure lubrication equipment. In fact, a conventional low pressure source such as a volume type grease gun is preferably used to minimize excessive grease pressure.

More particularly in the illustrated embodiment of the invention, the support frame member 3 adjacent the belt 1 is shown as a structural channel, and the leg of which defines a planar surface essentially parallel to and generally in the plane of the belt 1. The stub idler mounting bracket 9 is constructed substantially as disclosed in the above copending application and includes a slotted mounting plate 20 secured to the mounting end of the tubular bracket 9. Clamping nut and bolt units 23 which extend through the frame 3 and the slotted plate, rigidly and releasably affix the bracket 9 to the underside of the frame member 3.

The square mounting bracket 9 projects outwardly from the frame with a pair of opposed sidewalls 24. The bearing units 12 and 13 are affixed in the bearing tube 25, which, in turn, is affixed in the walls 24 for supporting of the roll 10. The roll 10 is a drum or cylindrical member 26 closed at the opposed ends by end discs 27 and 28. Each end disc 27 and 28 is shown as a similar flat plate member having an inner wall portion projecting into the cylinder 26 and protruding slightly therefrom. The outer diameter of the end disc is equal to the inner diameter of the cylinder 26 and defines a circumferential offset area within which a weld 29 is deposited to rigidly interconnect the end wall to the cylinder. The weld is formed with a smooth radius to eliminate sharp edges which cause belt damage. The support shaft 11 projects through the roll 10 and is firmly affixed by similar welds to each of the corresponding end disc.

The solid shaft 11 projects outwardly from roll 10 a short length to a stepped down bearing portion 31, which serves as a locating shoulder 32. In assembly, the shaft projects through the mounting bracket 9, with the shoulder 32 abutting the adjacent bearing unit 12 and the threaded end 33 extending through bearing units 13. Two clamping nuts 34 on shaft end 33 abuts unit 13 and secures the roll 10 to the mounting bracket 9. Clamping nuts 34 may be replaced with a conventional castle nut and cotter key or any other unit to securely lock the stub unit in place to the mounting bracket 9.

The bearing unit consists of a tube housing 25 with recesses at each end, extending through the mounting bracket 9 and rigidly secured within the opposite walls 24 of the mounting bracket 9, as by weldments. The bearing housing 25 is a cylindrical member having outer enlarged end bearing recesses 36. Similar bearings 12 and 13 are located in each of the recesses. Each of the bearings is preferably a roller bearing having an LM11949L cone and an LM11910 cup, particularly for a five inch diameter roll. The same structure may be used for a six inch diameter roll with an LM67048L cone and an LM67010 cup. The bearing recesses 36 further include outer stop recesses 37 on the outer ends of the bearing housing 25. Lip seals 38 and flat end washers 39 fit within the bearing recesses 36. The washers 39 form a flat outer wall on the outer end of the bearing housing. In assembly, the inner flat washer 39 abuts the shoulder on the shaft and the nuts 34 abuts the outer flat washer 39 to firmly and rigidly clamp the shaft 11 to and within the bearing assembly, thereby allowing the appropriate operating clearance for the closely spaced bearings 12 and 13 to be accomplished during assembly. The washers 39 also serve to protect the seals from external damage.

The mounting bracket 9 and bearing housing 25 are provided with a grease channel or passageway 40 which is fitted with the grease fitting 17. The passageway 14 extends radially outward essentially in alignment with the center of the bearing housing, and thus, chamber 16 between the bearing units 12 and 13.

The bearing housing 25 has an inner diameter larger than the diameter of the bearing shaft 11 projecting through the housing. The lubrication chamber 16 is thereby formed between the housing 25 within the mounting bracket in the illustrated embodiment, the spaced bearing units 12 and 13, and shaft 11 for containing lubricant. Periodically, fresh lubricant is supplied to maintain the desired lubrication and purge dirt from the seals.

The fixed fitting 17 in the bracket is adapted to receive a hand operated grease gun or other grease source for introducing of lubrication into the grease chamber between the bearings and thereby provide a reservoir of lubricant for the bearings.

The illustrated embodiment of the invention shows a relatively simple construction and support of the roll 10 in the external mounting bracket. The location of the bearing assembly within the closed mounting bracket structure minimizes the introduction of foreign material into the bearing units. Significantly, the location of the bearing units to the exterior establishes close location with respect to the grease fitting 17, thereby providing for a shaft diameter large enough to accommodate the heavier bending load due to the cantilevered construction, while allowing the use of readily available, standard idler bearings. The short length of passageway 14 particularly permits effective lubrication of the bearing units. Further, the bearing assembly can be lubricated using a low pressure application thereby minimizing any adverse effect resulting from high pressure application to the bearing seals and structure.

The re-lubrication which is necessary to establish a long operating life of the stub roller units is of substantial significance. The operator can readily provide the necessary re-lubrication at periodic intervals. The particular length of periods between lubrication will vary with the application and can be readily determined by the operator based on the particular known operating conditions and loads. It is anticipated that under average operating conditions, a factory lubrication will be provided and re-lubricated after approximately 3,000 to 4,000 hours of operation. This will of course vary with factors, such as, belt speed, material characteristics, temperature, humidity, and hours of daily operation, load tensions, and the like placed by the belt on the stub idler unit.

Of equal importance, is the ability of the user to reach the idler for periodic re-lubrication by establishing the external bearing assemblies 12 and 13 in the mounting bracket. The grease fitting 17 can be located so that it is stationary, permitting the easy addition of a flexible grease line 40 which permits access to the bearings from one side of the conveyor.

Figure 6:
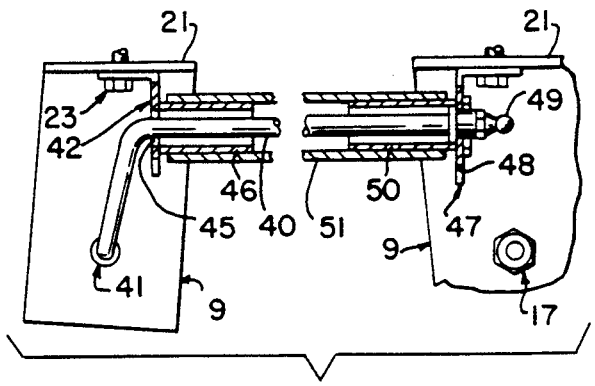
FIG. 6 is a view more clearly illustrating a grease line connection between the rear and far side stub idler units.

Referring particularly to FIGS. 2 and 6, the support structure for the hydraulic line 40 is more clearly illustrated. The hydraulic line 40 terminates in the one end at the far side of the conveyor in a tubular coupling 41 adapted to fit into the threaded grease opening in the bracket 9 and bearing housing 25 with a sealed connection. The line 40 is extended upwardly along the wall of the mounting bracket 9. An L-shaped support member 42 is secured to the mounting plate 21 by the mounting bolt unit 23. The depending leg 44 of the member 42 includes an opening 45 through which the hydraulic line is passed. The line 40 extends laterally across the conveyor between the conveyor frame structure and the lower run of the belt. A protective tube 46 is welded or otherwise secured to the depending leg 44 and projects outwardly therefrom concentric with the tube opening 45. The second end of the hydraulic line 40 at the near side of the conveyor is secured to the near side mounting plate 21 and particularly an L-shaped support member 47. The end of the line 40 is exposed to the exterior of the depending leg 48 of member 47 and includes a standard grease fitting 49 corresponding to the other grease fittings directly applied to the mounting bracket 10. A tube 50 is also secured to member 47 and projects laterally toward the far side. The tubes 46 and 50 are sized to telescopically fit anyone of various commercially available greased tubes or conduits 51 and provides protection for the line. The tube 51 is formed of rigid metal or other suitable material and cut to the proper distance between the mounting brackets on the near and far sides of the conveyor.

The present invention thus provides a cost effective and efficient stub idler unit for flexible sidewall conveyors with construction based on use of an existing industry standard idler shafts which simplifies bearings replacement and minimizes repair parts stock.

Various modes of carrying out the invention are contemplates as being within the scope of the following claims particularly pointing out and distinctly claiming the subject matter which is regarded as the invention.

I claim:

1. A conveyor apparatus including a flat flexible sidewall belt, comprising a frame structure means for moving the flat flexible sidewall belt across said frame structure, a plurality of edge supporting stub idler units longitudinally spaced along the length of the belt and engaging the outer peripheral edge of the underside of the belt and supporting the corresponding end portion of the belt, each of said stub idler units comprising a roll and a solid shaft rigidly secured to the roll and having a shaft end projecting axially outward from one end of said roll, a shaft support unit includes a bearing housing and a pair of axially spaced support bearings within said housing and defining a lubricant chamber between said bearings, said housing located immediately adjacent said one end of said roll, said shaft end being journaled in said bearings, a lubricating passageway in said housing between said bearings and including a lubrication input connector accessible externally of aid stub idler unit and accessible with said bearing means in said housing, said support includes a tubular mounting bracket, said bearing housing secured within said bracket, said mounting bracket and said bearing housing having said lubrication passageway extending inwardly from the outermost wall of said bracket and terminating in said lubricant chamber, said housing having a corresponding bearing recess in each end with said spaced bearings located in said recesses, said recesses having a seal member abutting the bearing and a washer abutting said seal, said shaft having a shoulder abutting the washer adjacent said roll and having a threaded end extending outwardly of said tube, a clamping nut on said threaded end abutting said washers.

2. A belt conveyor, comprising an elongated substantially flat flexible belt member having outwardly extending sidewall members, a plurality of longitudinally spaced support structures for supporting of the underside of said belt, idler stub units secured to said support structure for supporting of the outer edge portions of said belt to define a generally trough-shaped belt support, each of said stub idler units including a smooth surface cylindrical roll having opposite end closure walls and a stub shaft rigidly affixed to said ends walls and projecting axially outwardly of said roll, a rectangular tubular support post secured to said support structure in outwardly spaced relation to the outer edge of said belt, and said post including parallel spaced walls oriented in parallel relationship to the path of said belt, sealed bearings including a bearing housing secured within said mounting bracket with a separate bearing secured within said housing to the interior side of each of said parallel walls, said bearings being aligned to receive said shaft and rotatably supporting of said shaft, said mounting bracket including an adjustable mounting plate for relative fixed orientation of said roll relative to said sidewall member, said mounting plate being fixed to said post to support said shaft and roll at an angle to the plane parallel to said belt, the improvement comprising a centrally located passageway said mounting bracket and bearing housing extending inwardly from the outermost wall of the mounting bracket substantially centrally between said bearing and terminating between said spaced bearings, and a lubricant input connector secured to said passageway for selective and periodic lubrication of said bearings.

3. A stub idler apparatus for supporting a conveyor belt, a support shaft, a roll rigidly affixed to one end of the shaft with said shaft projecting axially outwardly from said roll to an outer end, a shaft support unit including a mounting housing and a pair of axially spaced support bearing means secured within said housing and including a lubrication chamber means between said bearing means, said shaft journaled in said bearings means and having said roll located immediately adjacent to one side of said housing for projection from said housing into support location for a conveyor belt, a fixed lubricating member coupled to said lubrication chamber and accessible externally of said support unit, and said support unit including a tubular mounting bracket having an end mounting plate and a pair of parallel walls extending essentially perpendicular to said plate, said bearing housing secured to said parallel walls, a lubrication passageway in said mounting bracket and housing extending from said outer wall of the mounting bracket into said chamber, and a grease fitting secured to said passageway for selectively supplying lubricant to said bearings.

* * * * *

UNITED STATES PATENT AND TRADEMARK OFFICE
CERTIFICATE OF CORRECTION

PATENT NO. : 5,027,940

DATED : July 2, 1991

INVENTOR(S) : WILLIAM S. WOODWARD

It is certified that error appears in the above-identified patent and that said Letters Patent is hereby corrected as shown below:

Claim 1, Col. 7, Line 11, after "edge" insert -- portion --; Claim 1, Col. 7, Line 12, after "corresponding" delete "end" and substitute therefor -- edge --; Claim 1, Col. 7, Line 23, delete "aid" and substitute therefor -- said --; Claim 2, Col. 8, Line 17, after "passageway" insert -- in --.

Signed and Sealed this

Sixth Day of April, 1993

Attest:

STEPHEN G. KUNIN

*Attesting Officer*    Acting Commissioner of Patents and Trademarks